March 19, 1968 D. T. NICHOLAS 3,373,655

SLIDE PROJECTOR

Filed Aug. 29, 1966

INVENTOR
DONALD T. NICHOLAS

BY Hauke, Krass, & Gifford
ATTORNEYS

United States Patent Office 3,373,655

Patented Mar. 19, 1968

3,373,655

SLIDE PROJECTOR

Donald T. Nicholas, 6200 Crabtree Road, Birmingham, Mich. 48010

Filed Aug. 29, 1966, Ser. No. 575,672
2 Claims. (Cl. 88—26)

The present invention relates to a slide projector improvement, and more particularly to an improvement enabling ordinary commercially available slide projectors to be used in conjunction with a punched card bearing a microfilm reproduction transparency of an original document.

It has now become common practice in the information storage and retrieval art to store visual information on punched cards provided with a window or aperture in which is disposed a microfilm transparency reduction of graphic, written or printed information. Such punched cards are in every other respect similar to the well-known rectangular business punched card of a standardized size of 7⅜ inch by 3¼ inch which stores diverse information by means of small rectangular punched holes disposed in rows and columns according to a predetermined code. The amount of information that can be stored on each card by way of the punched holes is somewhat limited, and it is substantially difficult to store and reproduce information of a graphic nature, such as mathematical curves, drawings, specification sheets, etc., in view of the limited area provided by the substantially small card.

The lack of space available for storage of information on an ordinary punched card is partly remedied by providing a cut-out substantially rectangular aperture or window disposed at a predetermined position, and which has been standardized in size to a dimension of 1⅞ inch by 1⅜ inch. The aperture or window is disposed close to one side of the card, the smaller side of the window closest to the side edge of the card being situated at a distance of about ⅝ of an inch therefrom and the longer sides of the window being situated approximately 15/16 of an inch from the top and the bottom edges of the card, respectively. In the window is placed, by cementing to the surface of the card proximate the edges of the window, a microfilm transparency providing a considerable amount of visual information under a substantially small area. In this manner, considerable information may be stored and retrieved at will. When the information is retrieved it is then necessary to enlarge the size of the microfilm transparency by way of a projector, or by means of any adequate enlarging means, so that the information on such transparency may be visually examined or photographically reproduced.

Apparatus heretofore available on the market have been manufactured for this well-defined special purpose to accommodate the size of the punched card and to present an enlarged image of the microfilm transparency on a rear viewed transparent screen, in a manner similar to the arrangement in well known ordinary microfilm "viewers," or adapted for distance projection of the transparency enlarged image upon a reflective screen or upon photographic paper.

Ordinary slide projectors available on the market, which are generally designed to accept 35 mm. transparencies or "slides," most of which are also capable of showing by projection transparencies up to 2¼ inch by 2¼ inch, are inadequate for projection of microfilm transparencies disposed in an appropriate window aperture in a punched card. This is due to the fact that ordinary slide projectors have a transparency framing and holding mechanism adapted for the specific size of the slides normally used in conjunction therewith, such slides having the transparency held in a mount provided with substantially narrow margins. In addition, ordinary slide mounts have a window or aperture substantially centrally located with respect to the mount.

The present invention permits to use a commercially available, substantially low price ordinary slide projector for displaying and enlarging the microfilm transparency disposed in a punched card. The slide projector is provided with a holder replacing the ordinary slide holder which is adapted to accept the standard of punched card size and to properly present the microfilm window or aperture therein in the proper position between the projector condenser lens and projection lens.

The principal object of the invention, therefore, is to provide a low cost projector capable of providing a projected visual display of a microfilm transparency mounted on a punched card.

Another object of the present invention is to provide an improved holder for a punched card having a microfilm transparency placed in a marginal window therein, utilizing a readily available slide projector which is modified at low cost to accept the improvement and which is still useful to show ordinary slide transparencies.

Other objects and advantages of the present invention will become apparent when the following description of an example thereof is read in conjunction with the accompanying drawings wherein.

Figure 1:
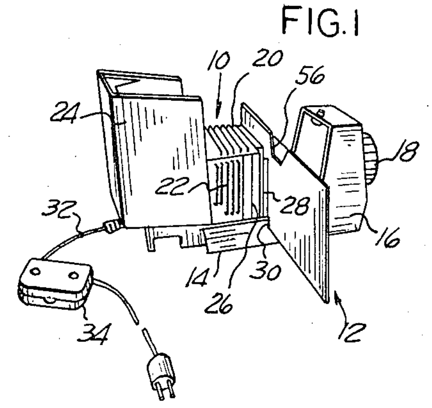
FIG. 1 is a perspective view of an improved slide projector according to the present invention.
Figure 2:
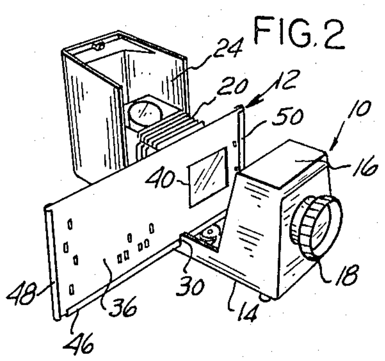
FIG. 2 is another perspective view of the improved slide projector of FIG. 1, seen under a different angle.
Figure 3:
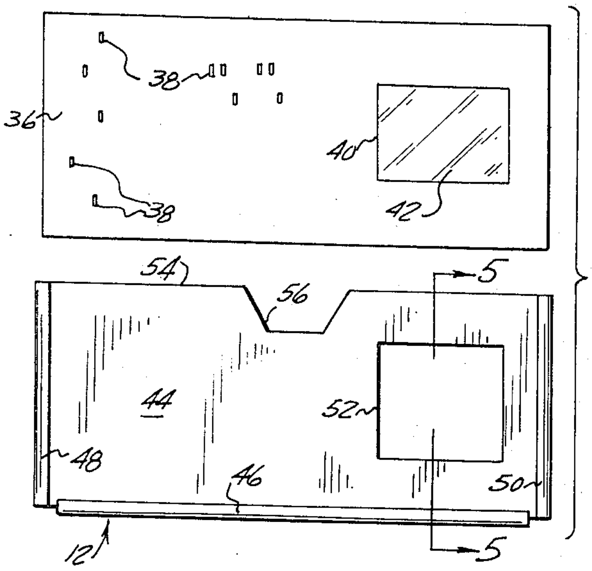
FIG. 3 represents a front elevation view of an example of a punched card holder according to the present invention, in the process of being loaded with a punched card provided with a microfilm transparency.

Referring now to the drawings, and more particularly to FIGS. 1–3 thereof, an improved slide projector according to an example of the present invention comprises an ordinary slide projector generally designated by numeral 10, modified to accept a punched card holder 12. The slide projector generally consists of a frame 14 made preferably of a casting and which is provided on the front thereof with an integral lens support 16 having a threaded opening which is adapted to receive the threaded body of a projection lens 18, which may be adjusted longitudinally so as to project a focused image upon a screen. The other end of the frame 14 slidably supports by way of a rail and slide arrangement, not shown, a lamp housing 20 containing an illuminating lamp, not seen, and having provision for gravity cooling of the lamp by way of louvres 22 disposed on the side end on the top of the housing, the bottom thereof, not seen, being generally open. The slide projector 10 is also provided with a swingable hood 24 which is hinged relatively to the frame and which is capable of being swung shut when the projector is not in use. At the same time as the hood 24 is shut, the lamp housing 20 being pivotally attached to the hood is forced to be slidably displaced toward the lens holder portion 16, so as to reduce the overall dimensions of the projector. The side of the lamp housing 20 situated toward the lens holder portion 16 defines a window in which is disposed a condenser lens, or, alternately, one of the lenses forming the condenser system, adapted to give full illumination of a transparency disposed proximate such window between it and the projection lens 18. The lamp housing 20 is provided on each vertical edge of the window with a rail member, shown at 26 in FIG. 1, which is adapted to accept one of the lateral mounting slides 28 of the card holder 12.

The elongated members forming the bottom portion of the frame 14 are provided with a slot 30 in which is engaged the bottom of the card holder 12. The card holder 12 is normally inserted in position by being slid down with its appropriate slides 28 engaging the rails 26, and the card holder may be removed by being slid up, any time that it is desired to replace the card holder 12 by a normal slide holder, not shown, or any time it is desired to close the hood 24 of the projector.

The projector is also provided with a power cord 32 for supplying electric power to the illuminating lamp, a switch 34 being disposed in the power line circuit for turning on and off the illuminating lamp.

Referring now to FIG. 3, there is shown a standard punched card 36, in the process of being manually introduced into the holder 12 to the normal projection position shown in FIG. 2. As shown in FIG. 3, the punched card 36 consists of a rectangular sheet of thin cardboard or stiff paper provided with a plurality of rectangular punched apertures 38 disposed in an ordinate manner in rows and columns according to a predetermined code, so as to permit classification and retrieval of the cards by way of the well known business punched card sorters and the like. As previously mentioned, the overall dimension of the card 36 is 7⅜ x 3¼ in., and the card is provided with a rectangular aperture or window 40 in which is disposed a microfilm transparency 42. The dimension of the window is normally of the order of 1⅞ x 1⅜ in., and the normally vertical side, as seen in the drawing, of the window closest to a short edge of the card is about ⅝ in. therefrom. The distance between each of the longer sides of the window 40, i.e. the horizontal sides as seen in FIG. 3, to each of the longest proximate edges of the card 36 is about 15/16 in. The card holder 12, as best seen in FIGS. 3–6, consists of a rigid thin plate 44, substantially rectangular in shape and provided with bent-over edges forming gutter-like U-channel shaped portions at the bottom and on two vertical sides thereof as shown at, respectively, 46, 48 and 50. Plate 44 is provided with an aperture or window 52, substantially rectangular or square in shape, in a position corresponding to the position occupied by the window 40 in the punched card 36. The area of the window 52 in the plate 44 is slightly greater than the area of window 40 in the card, so as to insure that the entire area of the microfilm transparency is framed by the window 52 when the card 36 is placed within the holder 12, as shown in FIG. 2. The upper edge 54 of the plate 44 is devoid of bent-over edge or U-channel portion so as to permit the card 36 to be manually slipped into the holder 12, the rear face of the card 36 being in engagement with the front face of the plate 44, and the bent-over edges 46, 48 and 50 of the plate holding the card securely in position so that its microfilm transparency window 40 substantially registers within the aperture or window 52 in the plate. The upper edge 54 of the plate is provided with a cut-out or notch 56 so as to permit human fingers to grasp both faces of the card for removal of the card from the holder 12 and for replacement by a different card.

Figure 5:
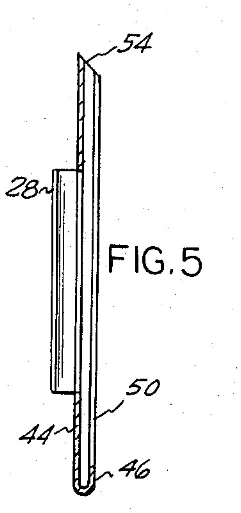
FIG. 5 is a sectional view thereof, as seen from line 5—5 of FIG. 3.
Figure 6:
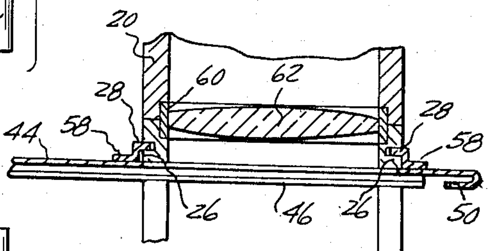
FIG. 6 is a sectional view thereof, as seen from line 6—6 of FIG. 4, and showing in addition a portion of the projector lamp housing.
Figure 4:
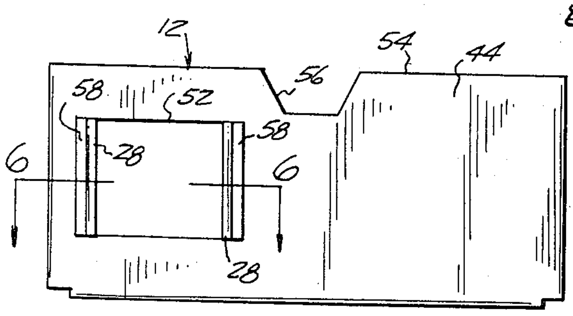
FIG. 4 is a rear elevation view of the holder of FIG. 3.

As best seen in FIGS. 4–6, the rear face of the plate 44 is provided with two parallel U-channel shaped slide members 28, preferably having a flat portion 58 for welding to the plate 44 along the two side edges of the window or aperture 52. As best seen in FIG. 6, each of the two U-channel shaped slide members 28 is adapted to engage one of the two parallel rails 26 mounted along the two vertical sides of window 60, on the end of lamp housing 20, situated toward the lens of the projector. Within the window 60 is disposed one of the condenser lens 62.

It can thus be seen that the improvement of the invention provides a punched card holder permitting an ordinary slide projector to accept punched cards having a window provided with a microfilm transparency. The holder presents the card window in the appropriate position for effective projection of the microfilm transparency by the usual projection assembly of the slide projector. The punched card holder is removable and replaceable by the normal projector slide holder.

It is evident that the embodiment herein described and illustrated has been given for illustrative purpose only, and it will be apparent to those skilled in the art that various modifications and changes in the details of the invention described may be conceived within the scope and spirit thereof, as defined in the appended claims.

What is claimed as new is:

1. An improvement for a slide projector comprising a frame, a housing on said frame, an illuminating lamp disposed in said housing, a projection lens and a condenser lens forming a window for said housing between said illuminating lamp and said projection lens, said improvement permitting said slide projector to project an enlarged image of a microfilm transparency disposed off center in a window in a card, said improvement comprising: a pair of substantially parallel rails each mounted on each side of said window on said housing, a substantially rectangular card holder plate having bent-over edges disposed along one bottom long side and two short sides, said bent-over edges forming a channel along each of said sides adapted to be engaged by an edge of said card, a rectangular aperture dimensionally at least equal to said window and disposed relatively to the sides of said plate so as to substantially register with the position of the microfilm transparency in said card and a pair of U-channel shaped slide members disposed on two sides of said rectangular aperture substantially parallel to the short sides of said plate and adapted to slidably engage said rails for fastening of said plate to said housing.

2. The improvement of claim 1 wherein said plate is provided on the edge of the top side thereof with a cut-out notch portion.

References Cited

UNITED STATES PATENTS

| | | | |
|---|---|---|---|
| 2,712,268 | 7/1955 | Dietmann | 88—27 |
| 2,869,421 | 1/1959 | Pokolic | 88—28 |

NORTON ANSHER, *Primary Examiner.*

J. W. PRICE, *Assistant Examiner.*